Jan. 2, 1945.　　　　B. A. MALKIN　　　　2,366,541
STEAM JOINT
Filed June 13, 1942
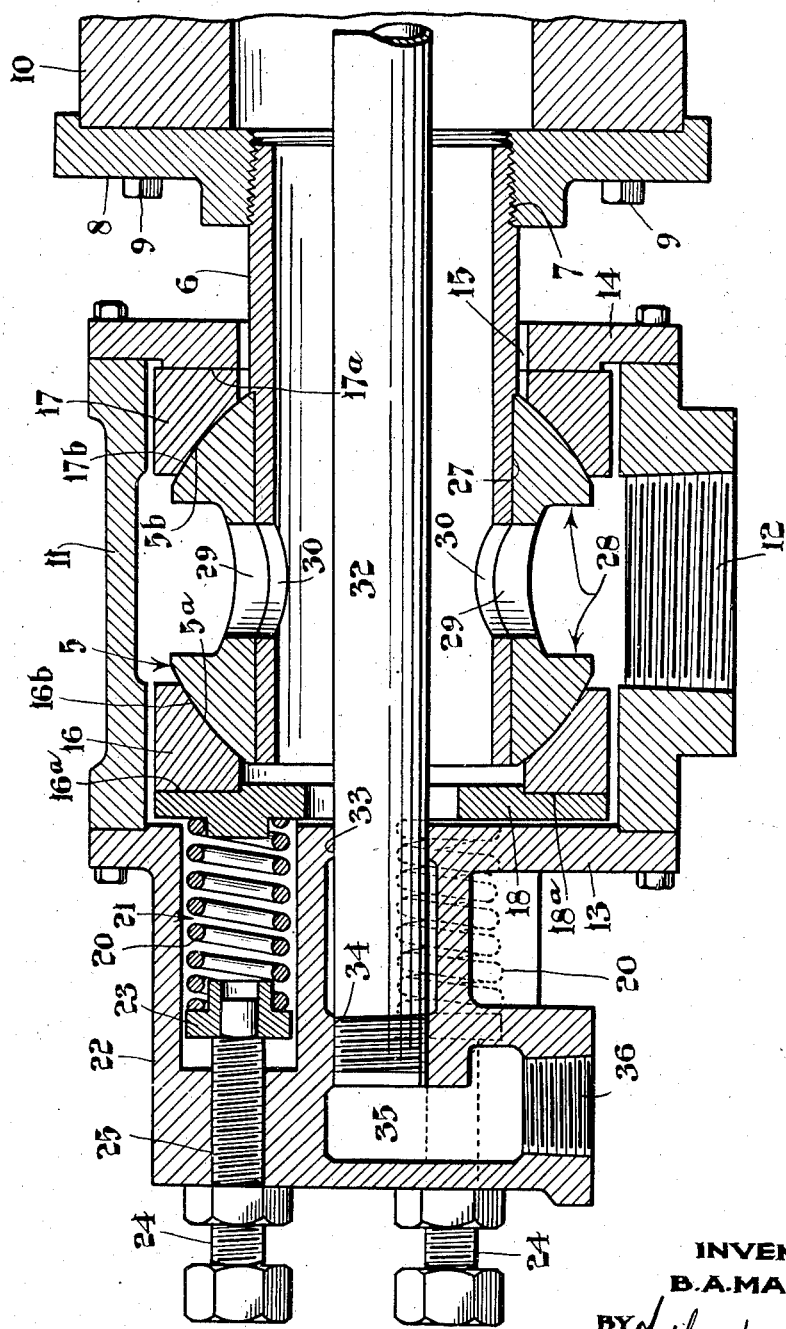
INVENTOR
B. A. MALKIN
BY Fetherstonhaugh & Co.
ATTORNEYS Patented Jan. 2, 1945

2,366,541

UNITED STATES PATENT OFFICE 2,366,541

STEAM JOINT

Bernard A. Malkin, Lachine, Quebec, Canada, assignor to Dominion Engineering Works Limited, Lachine, Quebec, Canada Application June 13, 1942, Serial No. 446,996

1 Claim. (Cl. 285—10)

This invention relates to steam joints for dryer and other steam heated cylinders and the object is to provide an improved self-aligning ball and socket joint of the pressure sealed type.

A more specific object is to provide an improved pressure sealed ball and socket joint in which the ball and socket members and the springs for pressing said members together are arranged, in a novel manner, within an enclosing casing so that access may be obtained to the springs by simply removing an end wall of the casing in which the springs are mounted.

A further object is the provision of an improved pressure sealed ball and socket joint in which the ball member is made in one piece and is interposed between two socket forming rings provided with concave spherically curved surfaces engaging convex spherically curved ball member surfaces which are fixed in relation to each other so that they have, at all times, the same radius and the same centre of curvature, said ball member and rings being floatingly arranged within an enclosing stationary casing provided with an end opening for the passage of a nipple to which the ball member is secured, said end opening being sufficiently larger than the nipple to permit the latter to have a substantial range of lateral and angular movement relative to said casing, said joint being further characterized in that said ball member and said rings are pressed together by springs located at the outer side of and acting against one of said rings.

Other objects, advantages and characteristic features of this invention will be more readily understood from the following detailed description taken in connection with the accompanying drawing, in which the single figure is a longitudinal sectional view of my improved joint, and shows one method of attaching the rotary part of the joint to a journal of a steam heated drying or other cylinder.

Referring more particularly to the drawing, 5 designates a ball member rigidly mounted at one end of a nipple 6, the other end of said nipple being screwed into the central opening 7 of a flange-forming plate 8 which is fastened, by stud bolts 9 or other suitable fastening means, to the end face of a journal 10 representing the journal of a dryer or other steam heated cylinder. The ball member 5, nipple 6 and plate 8 rotate as a unit with the journal 10 and constitute the rotary element of my improved joint.

The ball member 5 is enclosed by a housing 11 provided with a steam inlet 12 and removable end heads 13 and 14, the head 14 being provided with an opening 15 for the passage of the nipple 6. The housing 11 also encloses two bearing rings 16 and 17 which constitute the socket members of the joint, the ring 16 being interposed between the ball member 5 and the end head 13 and the ring 17 being interposed between the ball member 5 and the end head 14. The ring 16 is formed with a flat outer surface 16a and a concave spherically curved inner surface 16b, the latter being fitted against the adjacent convex spherically curved surface portion 5a of the ball member 5. The ring 16 is centered on and supported by a pressure plate 18 which is recessed, as at 18a, to receive the flat side of said ring. The ring 16 and the pressure plate 18 are urged toward the ball member 5 by the inner ends of coil springs 20 arranged in suitable spring pockets 21 provided in a casting 22 carried by the end head 13. The outer end of each spring 20 is fitted against a spring seat member 23 mounted on the inner end of an adjusting bolt 24 which extends into the spring pocket 21 through a threaded hole 25 provided in the casting 22. The bolts 24 provide readily accessible means for varying the effective pressure of the springs 20 against the pressure applying plate 18.

The ring 17 is provided with a flat outer side 17a and with a concave spherically curved inner surface portion 17b. This ring is arranged with the flat side 17a in sliding contact with the inner side of the end head 14 and with the concavely curved surface portion 17b in contact with the convex spherically curved portion 5b of the ball member 5. The ring 16 serves as a socket forming ring and also as a thrust bearing for the ball member 5. The ring 17 serves as a socket forming bearing ring for the ball member 5 and also as a sealing ring to prevent escape of steam through the end opening 15 of casing 11. The ball member 5 is here shown as a separately formed one piece member provided with a nipple receiving bore 27 and a continuous annular groove 28, the latter extending around the ball member at right angles to the bore 27. The bottom wall of the groove 28 is pierced by a plurality of openings 29 registering with similar openings 30 provided in the ball carried portion of the nipple 6.

The sealing rings 16 and 17 and the pressure applying plate 18 are dimensioned so that these parts are free to move relatively to the casing 11 in planes substantially paralleling the inner surfaces of the end heads 13 and 14. In this connection it will also be noted that the diameter of the opening 15 of end head 14 is substantially greater than the outside diameter of the nipple which passes through said opening. It will therefore be evident that the nipple 6 is capable of substantial lateral as well as angular movement relative to the casing 11 to take care of any misalignment due to faulty installation of the joint or to lateral movements of the journal 10.

The pressure of the springs 20 acts, through the pressure plate 18, ring 16 and ball member 5, to hold the flat side 17a of the sealing ring 17 in contact with the inner side of the end head 14. The ball member 5 is also forced against the sealing ring 17 by the pressure of the steam contained within the casing 11. In other words, the steam supplied to casing 11 through the steam inlet 12 surrounds the ball member 5 and tends to force it in the direction of the end head 14 so that the sealing ring 17 is thus maintained in tight sealing contact with both the ball member 5 and the end head 14. This constitutes the pressure sealing feature of the joint.

A conventional condensate pipe 32 is shown extending outwardly through the journal 10 and the nipple 6 and into a pipe receiving bore 33 provided in the extension 22 of the end head 13, the outer end of said pipe being in screw threaded engagement with the outer portion of said bore as indicated at 34. The condensate which is discharged from the interior of the steam heating cylinder through the pipe 32 is delivered to a condensate receiving chamber 35 which communicates with the outer end of the pipe receiving bore 33 and is provided with a condensate outlet 36.

When the joint described herein is in use the steam supplied to casing 11 passes into nipple 6 through the open outer end of said nipple and through the openings 29 and 30 and is delivered through journal 10 to the interior of the dryer or other steam heated cylinder of which the journal forms a part. The condensate accumulating within the cylinder is discharged through the condensate pipe 32 to the condensate collecting chamber 35 from whence it is delivered through the outlet 36 toward any suitable point of discharge.

The openings 29 and 30 are preferably dimensioned so that the total area thereof is at least equal to the area of the steam inlet 12. It will also be noted that the path of steam flow from the opening 12 to the openings 29 and 30 is free of flow reducing obstructions. These features are important in that they provide a joint which has a steam flow capacity which is at least equal to the flow capacity of the inlet opening 12. Another advantage of the joint described herein is that the springs 20 which ensure proper initial seating contact between the ball member 5 and the seating or bearing rings 16 and 17 are arranged so that access may readily be obtained thereto by removing the end head 13.

The rings 16 and 17 are self-lubricating, being made of a suitable carbon graphite composition or some other composition which is a natural lubricant.

It is not essential that the ball member 5 and the nipple 6 be formed separately as shown herein since these two parts may be formed integral with each other if so desired. Various other modifications may be resorted to within the scope and spirit of the invention as defined by the appended claim.

Having thus described by invention, what I claim is:

A steam joint of the character described comprising a ball member provided with a nipple receiving bore open at both ends and with an annular groove extending around the outer surface thereof at right angles to said bore, the bottom wall of said groove being pierced by a series of openings communicating with said bore, a nipple open at both ends and having one end portion thereof fitted in said bore, said end portion of the nipple being provided with a series of openings registering with the openings piercing the bottom wall of said groove, a casing enclosing said ball member and having end walls, one end wall of said casing being provided with a relatively large opening through which the nipple extends with considerable clearance and the other end wall of said casing being provided with a condensate receiving chamber and with a plurality of spring pockets, said pockets opening into the interior of said casing, a condensate pipe extending through the nipple and having its delivery end secured to the last mentioned end wall of the casing in communication with said condensate receiving chamber, a combined bearing and sealing ring interposed between and in contact with opposing surfaces of the ball member and the end wall of the casing through which the nipple extends, a bearing ring interposed between the ball member and the remaining end wall of the casing and disposed in bearing contact with said ball member, a pressure applying plate engaging the side of the last mentioned bearing ring remote from the ball member, springs arranged in said spring pockets with their inner ends engaging the outer side of said pressure applying plate and pressure regulating means engaging the outer ends of said springs and operable to vary the effective pressure of the springs against said pressure applying plate said ball member, rings and pressure applying plate being dimensioned so as to permit these parts to move independently of the casing in planes substantially paralleling the inner surfaces of the end walls of the casing.

BERNARD A. MALKIN.